United States Patent [19]
Armand

[11] 3,788,144
[45] Jan. 29, 1974

[54] PRESSURE MEASURING APPARATUS AND METHOD
[75] Inventor: Harold A. Armand, Houston, Tex.
[73] Assignee: Texas Instruments Incorporated, Dallas, Tex.
[22] Filed: Dec. 27, 1971
[21] Appl. No.: 212,455

[52] U.S. Cl. .............................. 73/411, 73/398 R
[51] Int. Cl. ............................................ G01l 7/04
[58] Field of Search..... 73/418, 411, 398 R; 33/1 L; 250/231 P, 231 R

[56] References Cited
UNITED STATES PATENTS
3,286,529  11/1966  Damrel, Jr. et al................... 73/418
3,365,799  1/1968   Fisher................................. 33/1 L Primary Examiner—Donald O. Woodiel

[57] ABSTRACT

In a pressure measuring apparatus of the type wherein one end of a Bourdon tube spiral is deflected in response to pressure applied at the other end of the spiral, the applied pressure is measured as a function of the time required for a uniformly rotating object to rotate through the angle of deflection. An optoelectrical system is employed to optically detect the deflection angle and electronically count the number of pulses of a reference oscillator signal which occur during the time required to uniformly rotate through the detected angle. A display device is calibrated to display the count of the counter in actual pressure units.

10 Claims, 5 Drawing Figures

PRESSURE MEASURING APPARATUS AND METHOD

This invention relates to pressure measuring apparatus and methods, and more particularly to pressure measuring apparatus of the type which employs a Bourdon tube and means for measuring the deflection angle of the Bourdon tube resulting from applied pressure.

In a typical prior art pressure measuring system, a mirror which is secured to one end of a Bourdon tube is rotated in response to pressure applied at the other end of the Bourdon tube. A light source emits a light beam which is reflected by the mirror and detected by a photo-electric detector. The electrical output of the detector is coupled to a servomotor which in turn is geared to rotate the position of the light source and/or detector to the position of maximum coincidence, or other calibration position. The angle of rotation is monitored and is calibrated into pressure units. The system further includes a display device for numerically displaying the measured pressure.

The present invention is directed to an improvement in the type of pressure measuring apparatus discussed generally above. One problem with such prior art systems is a slow response in measuring pressure changes. The pressure reading is subject to errors caused by electrical drift in the amplifier, light source and detector. The various mechanical and electromechanical parts may require maintenance and repair. Also, such prior art apparatus is totally analog in nature, with attendent problems in interfacing with digital equipment.

In the pressure measuring apparatus of this invention, pressure is measured by monitoring the time required to rotate at a uniform speed through the Bourdon tube deflection angle, rather than a mechanical measurement of the angle itself. The time required to rotate from a zero pressure position, or start position, to an actual pressure position, or stop position, is counted with an electronic counter. An opto-electrical system generates a start pulse when a uniformly rotating object is rotated through the zero pressure position and a stop pulse when the uniformly rotating object is rotated through the actual pressure position. The electronic counter counts the number of cycles of a reference oscillator signal which occur between occurrence of the start and stop pulses. The counter of the counter is calibrated into pressure units and visually displayed. The system employs digital techniques and thus provides a quick response and is relatively free of conventional sources of error associated with analog systems. Elimination of mechanical and electromechanical components reduces and simplifies problems of maintenance and repair. The pressure measuring apparatus may be readily interfaced with digital systems to afford a wide variety of applications.

Objects and advantages of the invention will become even more apparent from the following detailed description read in conjunction with the drawings. in which.

The pressure measuring apparatus of this invention measures the angle of deflection of a Bourdon tube spiral, and hence the applied pressure, by measuring the time required for a uniformly rotating object to rotate through the angle of deflection. An opto-electrical system is employed to optically detect the deflection angle and electronically count the time required to rotate uniformly through the detected angle.

Figure 1:
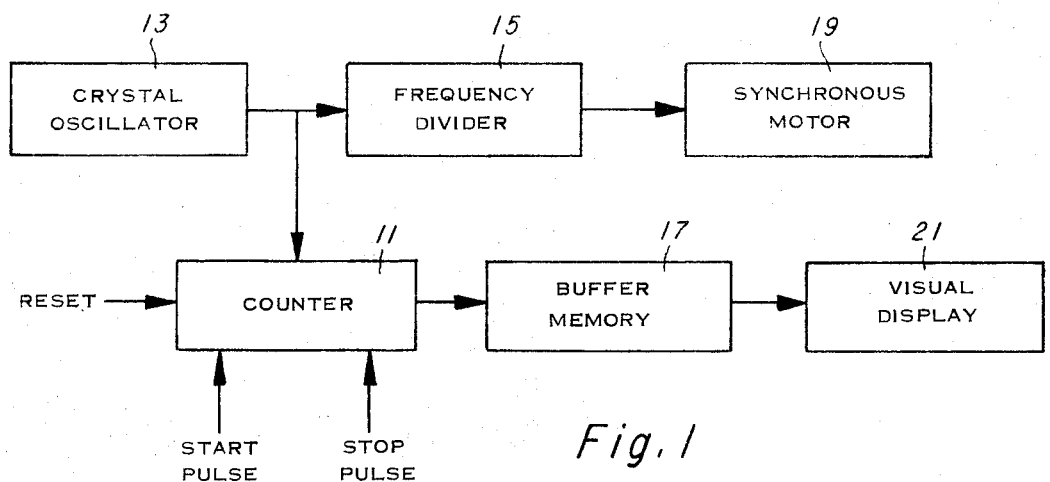
FIG. 1 is a block diagram of the electrical components of a pressure measuring appratus.

Referring now to the drawings, FIG. 1 is a general block diagram of the electrical components of the pressure measuring appratus. Crystal oscillator 13 provides synchronization and control of synchronous motor 19 and counter 11. The output of the crystal oscillator 13 is divided by the frequency divider 15, which is coupled to synchronous motor 19. The oscillator output is also coupled to drive counter 11, the output of which is coupled through the buffer memory 17 to control visual display 21. The buffer memory provides temporary storage to interface the counter with visual display 21. The counter 11 will count the number of cycles of the oscillator signal between the occurrence of a start pulse and a stop pulse. Prior to each new pressure measuring time period, which begins with the occurrence of a start pulse, a re-set signal will be applied to the counter. After the occurrence of the stop pulse the count of the counter 11 is transferred to the buffer memory and then to the visual display 21, where a pressure reading in actual pressure units is displayed. The occurrence of the start pulse and stop pulse respectively designate the beginning and end of the time period required for an object coupled to the synchronous motor to rotate through the Bourdon tube deflection angle.

Figure 2:
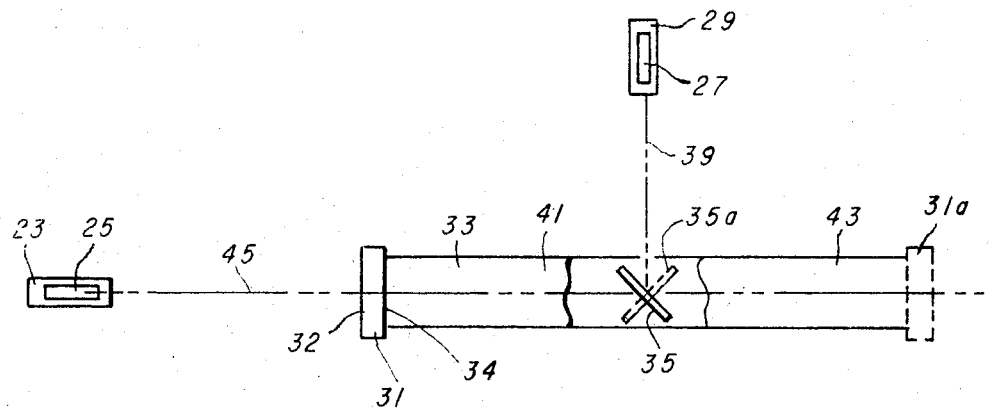
FIG. 2 is a schematic diagram of the optical components of a pressure measuring apparatus.

The optical and mechanical components of the pressure measuring system are schematically illustrated in FIG. 2. The system is comprised of a rotating mirror 31, both sides of which are reflective, which is mounted at one end of uniformly rotating arm 33, which is coupled to be uniformly rotated by synchronous motor 19. The tube mirror 35 is attached to one end of the Bourdon tube spiral (not shown), such that the tube mirror 35 is rotated in position by an angle corresponding to the angle of deflection of the Bourdon tube spiral which results from applied pressure. The tube mirror 35 is shown in the pressured position, with the unpressured position being designated 35a. The system is further comprised of a first combination light source 29 and photoelectric detector 27 and a second combination light source 23 and photoelectric detector 25. When the tube mirror 35 is in the unpressured position 35a, the light emitted as the light ray 39 from light source 29 will be reflected from the tube mirror as reflected ray 41, and when the rotating mirror 31 is in the position shown, will be reflected back to position 35a and thence reflected to light detector 27 which will provide an electrical pulse signal. The electrical pulse signal output of detector 27 is dependent on both the position of the tube mirror 35 and the rotating mirror 31.

Similarly, when the rotating mirror 31 is in the position illustrated, the light ray 45 emitted from light source 23 will be reflected from mirror 31 and received by detector 25, which will produce an electrical pulse output signal. The electrical pulse signal from detector 25 is dependent only on the location of the mirror 31. The components are arranged such that there will be a simultaneous electrical pulse from the detectors 25 and 27 only when the tube mirror 35 is in the unpressured position 35a; if the respective arrangement were otherwise, it would be necessary to pre-load the counter to account for the time differential.

In operation, as uniformly rotating arm 33 rotates the rotating mirror 31 around to the position shown, there will be an electrical pulse signal produced by detector 25. This signal is the start pulse. Tube mirror 35 is shown in a deflected position, corresponding to applied pressure. When the uniformly rotating arm 33 has rotated around to position 31a, an electrical pulse signal will be produced by detector 27 as a result of reflection by mirror 35 to mirror 31 and back again to detector 27. The pulse output of detector 27 is the stop pulse. The system of FIG. 1 is used to count the time required to rotate the tube mirror from position 31 to position 31a, by counting the number of pulses of the oscillator signal which occur during this time period.

Figure 3:
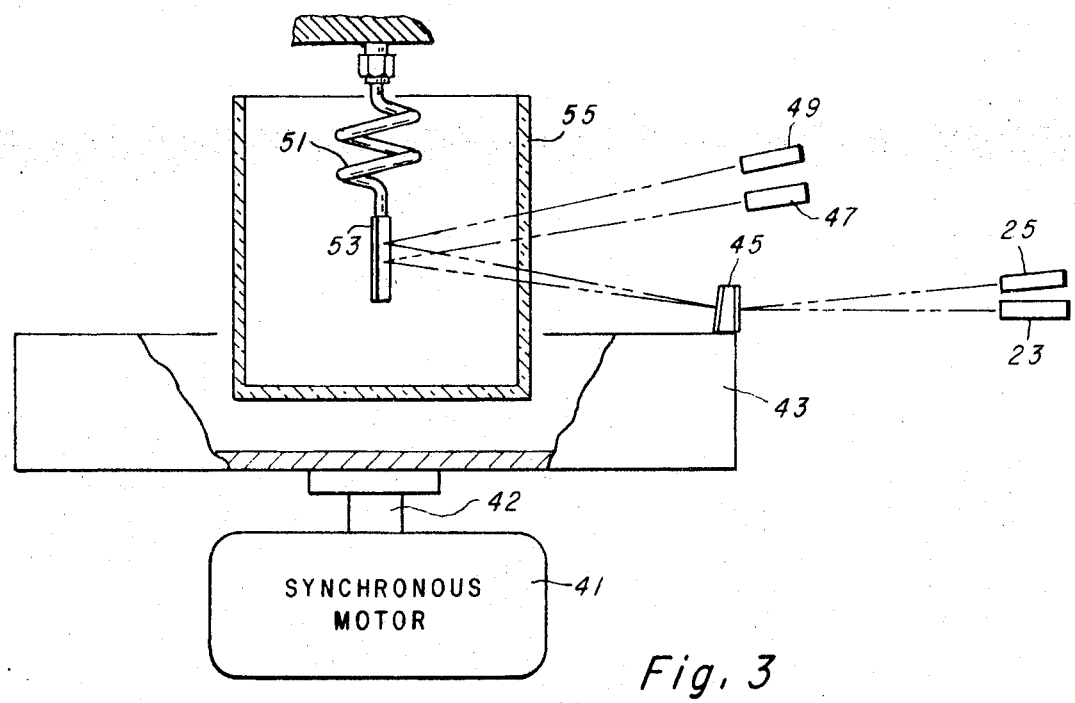
FIG. 3 is a partial section view of the pressure measuring apparatus.

The system of FIG. 2 may be mechanically implemented in the manner illustrated in FIG. 3. Synchronous motor 41 is coupled by shaft 42 to uniformly rotate the cup 43. Rotating mirror 45 is mounted near the top and on the inside of cup 43. The glass capsule 55 is suspended above the rotating cup, with the Bourdon tube spiral 51 suspended therein, having tube mirror 53 connected to the lower end thereof. When pressure is applied to the upper end of the Bourdon tube spiral, the spiral unwinds slightly and causes the tube mirror 53 to rotate in position. The photoelectric detector 49 and light source 47 are fixedly mounted such that the light beam emitted from source 47 is reflected by tube mirror 53, and as the rotating mirror 45 rotates through the incident position, the light beam will be reflected from rotating mirror 45 back to tube mirror 53 and detected by detector 49. Detector 25 produces a start pulse when mirror 45 rotates through the position required to reflect light from source 23 to detector 25. The rotating cup design minimizes air loading and comprises a safe construction.

Figure 4:
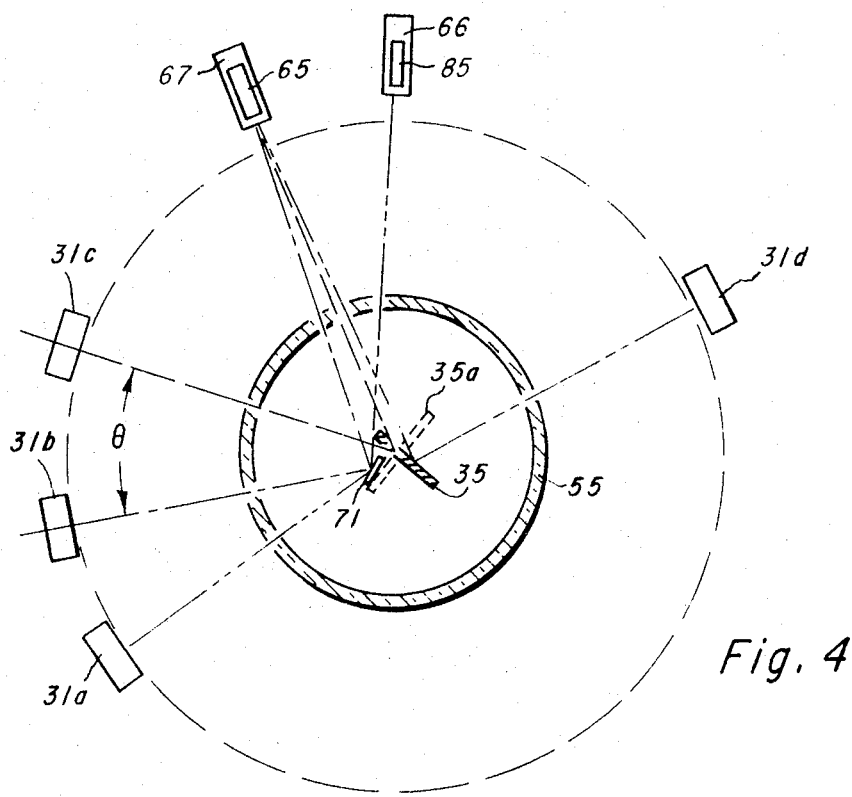
FIG. 4 is a schematic illustration of an alternate pressure measuring apparatus.

An alternate embodiment of the pressure measuring apparatus of this invention is schematically illustrated in FIG. 4. When the tube mirror is in the unpressured position 35a, a light beam emitted from light source 67 will be reflected from the tube mirror to the rotating mirror position 31c, which is the zero pressure position of rotating mirror 31, i.e., the position of rotating mirror 31 which will result in a pulse output of detector 65 when the tube mirror 35 is in the unpressured position. When the rotating mirror rotates through position 31c, a light beam will be reflected back to the tube mirror and from there to the photoelectric detector 65. Thus detector 65 will provide an electrical pulse output when the tube mirror is at the zero pressure position as the rotating mirror rotates through position 31c.

When the tube mirror is at the full scale deflection position 35, a light beam emitted from source 67 will be reflected from the surface of the mirror to the full scale rotating mirror position, or full scale pressure position, 31d. As the rotating mirror rotates through position 31d, the light beam will be reflected back to mirror 35 and from there to detector 65, producing an electrical pulse output, which is a stop pulse. The time required for the rotating mirror to rotate from the tube mirror zero position 31c to the full scale position 31d is dependent upon the maximum angle of deflection of the Bourdon tube spiral, which in turn is dependent upon the maximum applied pressure. Similarly, for any position of the tube mirror between positions 35 and 35a, corresponding to an applied pressure between zero and full scale, there is a unique position of the rotating mirror between positions 31c and 31d for which detector 65 will produce an electrical pulse as the rotating mirror is rotated through that unique position.

As the rotating mirror rotates through position 31b, the "start" position, a light beam emitted from light source 67 will be reflected by the fixed mirror 71 to the rotating mirror and back again, and from there to the detector 65, causing it to produce an electrical pulse which is the start pulse. Since the start position 31b precedes the zero pressure position 31c by an angle $\theta$, the counter must be pre-set to account for the time required to rotate through angle $\theta$.

Since the same photoelectric detector provides both the start pulse and the stop pulse, it is desirable to be able to distinguish between these pulses. A second light source 66 emits a light beam which is reflected by fixed mirror 71 to synchronization position 31a. As the rotating mirror rotates through position 31a, the light beam is reflected back to fixed mirror 71 and thence to detector 85, which produces an electrical pulse, a synchronization pulse. Thus the first pulse output from detector 67 to occur after the pulse output of detector 85 is the start pulse.

Figure 5:
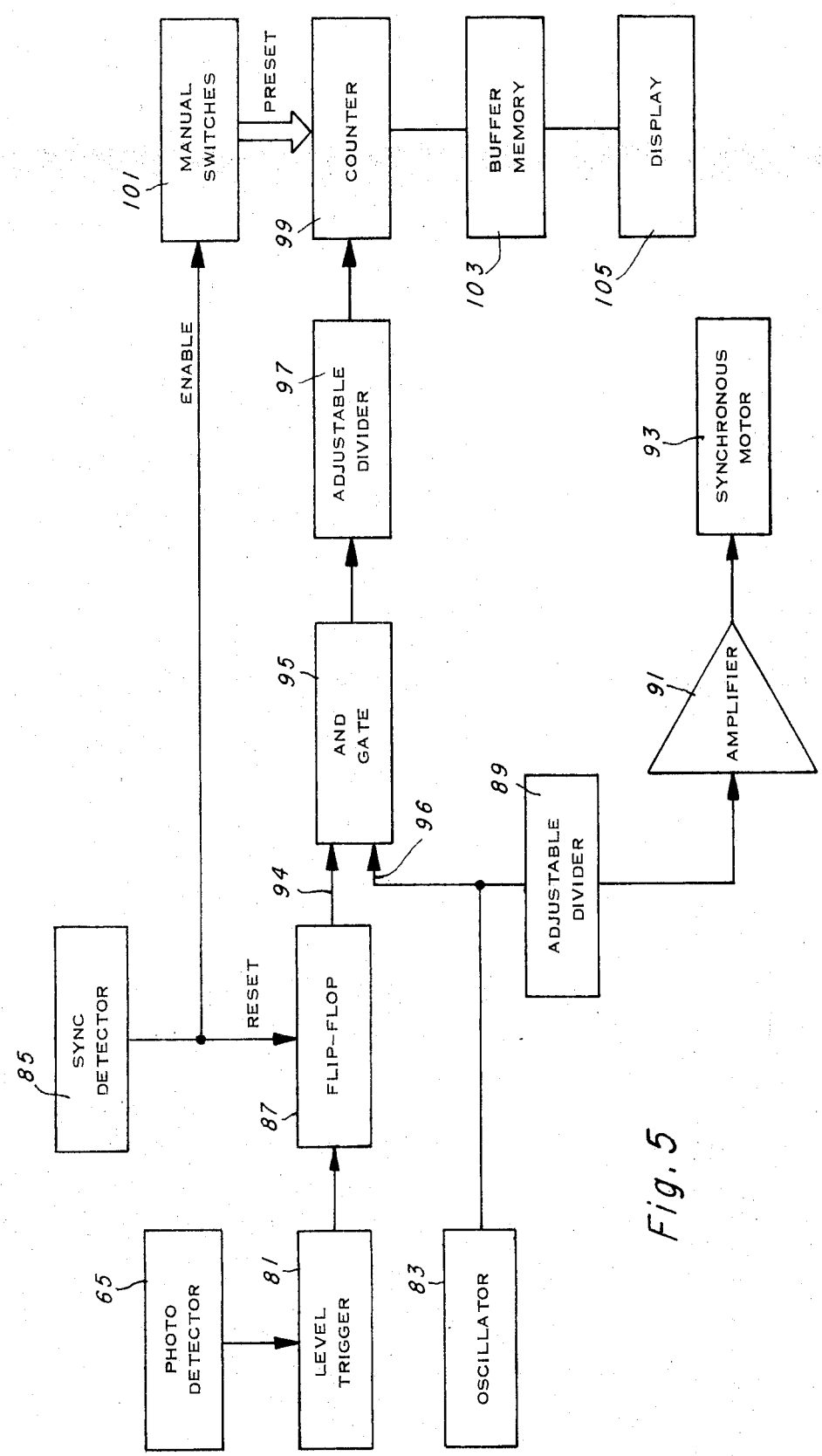
FIG. 5 is a block diagram of the electrical components of the alternate pressure measuring apparatus.

A block diagram of the electronic components of this alternate embodiment of the pressure measuring apparatus is illustrated in FIG. 5. The output of detector 65 is coupled to a level trigger 81, which be a be conventional Schmidt trigger or other electronic device which produces a pulse output when the input thereto reaches a predetermined magnitude. The output of level trigger 81 is coupled to the toggle input of flip flop 87. The reset input of flip-flop 87 is coupled to the synchronization detector 85. Thus each time the rotating mirror 31 is rotated through synchronization position 31a, detector 85 supplied a logic pulse to the reset input of flip flop 87. Then when the rotating mirror 31 rotates through the start position, detector 65 will produce a pulse which will trigger the level trigger 81, providing a logic pulse to the toggle input of flip flop 87. The output of flip flop 87 is coupled to input terminal 94 of the AND gate 95. The output of flip flop 87 acts as an enabling input to the gate 95, to enable the counter 99 to being counting when the start pulse occurs. The output of the oscillator 83 is coupled to the input terminal 96 of the gate 95, such that when terminal 94 is enabled, the output of AND gate 95 is controlled according to the logic condition at input terminal 96. In this manner, the output of AND gate 95, which is coupled through the adjustable divider 97 to control counter 99, is determined according to the frequency of the oscillator 83. That is, the count of the counter 99 is dependent upon the number of cycles of the oscillator which occur while terminal 94 of AND gate 95 is enabled.

In operation, as the rotating mirror rotates through the synchronization position 31a, synchronization detector 85 will produce a logic pulse at the reset input of flip flop 87. Then as the rotating mirror rotates through the start position 31b, detector 65 will produce a pulse which will trigger level trigger 81, and thus apply a pulse through flip flop 87 to enable input terminal 94 of AND gate 95. As the rotating mirror rotates around to the pressured position, at a point between position 31c and 31d, the detector 65 will produce another logic pulse which will trigger the level trigger 81 to apply a pulse to the toggle input of flip flop 87, causing the output of flip flop 87 to disable AND gate 95. Thus the number of cycles of the oscillator 83 which occur between the start pulse and stop pulse of detector 65 determine the count of the counter 99. The same oscillator 83 is used to control the speed of the synchronous motor 93, which is coupled to uniformly rotate the rotating mirror. The output of the oscillator is coupled through an adjustable divider 89 and through buffer amplifier 91 to control the speed of motor 93. Using the same oscillator to control the count of the counter and the speed of the motor simplifies synchronization problems and promotes convenience and economy. The adjustable divider 89 enables the oscillator frequency to be divided down to a desired motor speed, or frequency. The adjustable divider 97 enables the frequency of oscillator 83 to be divided down to a desired count for the counter 99.

The output of synchronization detector 85 is also coupled to enable manual switches 101. The manual switches 101 are conventional rotary switches which may be pre-set to a predetermined position, thus to preset the count of the counter to a desired value, correspoinding to angle θ between the start position and zero pressure position. The counter 99 will be pre-set to a count corresponding to the time required for the rotating mirror to rotate from the start position 31b to the tube zero position 31c, but the counter will begin anew at the tube zero position 31c and count to the position of pressured deflection. As the count of the counter 99 is incremented, the total count is stored in the buffer memory 103, and at the end of the count it is transferred to display 105 which has a display in actual pressure units.

In a typical system, the maximum angle of deflection of the tube mirror 35 may be 50°, corresponding to 100° of rotation of the rotating mirror. The system constants, including oscillator frequency, divider ratios and motor speed, may be adjusted to provide a direct reading in pressure units. In a specific embodiment of the system of FIG. 5, the frequency of reference oscillator 83 is 36 MHz. This frequency is divided down by divider 89 to provide a motor speed of 1,200 rpm, or 20 revolutions per second. Thus $1.8 \times 10^6$ pulses of the reference oscillator signal will occur during one revolution of the rotating mirror. If for the particular Bourdon tube employed, 1° of tube mirror deflection corresponds to two psi of applied pressure, then each degree of rotation of the rotating mirror corresponds to one psi of applied pressure. If the divider ratio of adjustable divider 97 is five, then 1,000 pulses of the input signal to counter 99 corresponds to one psi of applied pressure. Thus the count of the counter is directly proportional to applied pressure, accurate to the third decimal. For example, a count of 36,001 cycles by the counter 99 corresponds to an applied pressure of 36.001 psi.

It is apparent that a higher oscillator frequency may be employed to provide a more accurate pressure reading, accurate to the fourth, fifth or even more decimals. However, practical limitations of the system render such accuracy unobtainable. Such accuracy can be consistently obtained to a relative degree, however, by counting the oscillator pulses for the appropriate time period for a plurality of revolutions, summing a total count, and then dividing the total count by the number of revolutions to obtain an average count. The additional electronics required to obtain such accuracy is relatively simple and inexpensive.

Although separate oscillators could be employed to drive the synchronous motor and counter, the advantages to be obtained by utilizing a common oscillator should be noted. In addition to reduce expense and physical space requirements, the common oscillator system is inherently more accurate. The pressure reading is unaffected by frequency drift in the oscillator, since resulting changes in motor speed are offset by proportional changes in pulse count.

Although the invention has been described with reference to specific embodiments thereof, it is to be understood that the description herein is intended only to be illustrative of the principles disclosed.

What is claimed is:

1. In a pressure measuring apparatus of the type including a Bourdon tube coupled to be responsive to applied pressure at one end to produce an angular deflection at the other end, the combination comprising:
    a. a uniformly rotating object, a point on said uniformly rotating object describing a circle concentric with said other end of said Bourdon tube;
    b. means for providing a stop electrical pulse as said point on said uniformly rotating object rotates through a position on said circle corresponding to the angular deflection of said Bourdon tube, the distance of said position along the circumference of said circle being linearly related to said angular deflection of said Bourdon tube;
    c. means for providing a start electrical pulse as said point on said uniformly rotating object rotates through a position on said circle corresponding to the undeflected position of said Bourdon tube, such that when said Bourdon tube is in said undeflected position said stop and start electrical pulses will occur simultaneously; and
    d. counting means for counting the time which elapses between the occurrence of said start and stop electrical pulses.

2. The apparatus of claim 1 further comprising oscillator means for producing a reference oscillator signal, and wherein said counting means counts the number of pulses of said reference oscillator signal which occur during the time period between the occurrence of said start and stop electrical pulses.

3. The apparatus of claim 2 further comprising display means for displaying the count of the counting means in actual pressure units.

4. In a pressure measuring apparatus including a Bourdon tube coupled to be responsive to applied pressure at one end thereof to create a deflection angle proportional to said applied pressure at the other end thereof, the combination comprising:
    a. a first mirror having both sides reflective;
    b. motor means coupled to rotate said first mirror along the circumference of a circle at a uniform rate of speed;
    c. a second mirror connected to said other end of said Bourdon tube and located at the center of said circle to be rotated in position corresponding to applied pressure;
    d. first light source and photoelectric detector so positioned that as said first mirror passes through a zero pressure position light from said first source will be reflected by said first mirror back to said first detector causing a first electrical pulse;

e. second light source and photoelectric detector so positioned that as said first mirror passes through a pressured position light from said second source will be reflected by said second mirror, then by said first mirror, then by said second mirror back to said second detector causing a second electrical pulse such that the time delay between said first and second electrical pulses is directly proportional to the pressure induced angular rotation of said Bourdon tube;

f. oscillator means for providing a reference signal and coupled to control the speed of said motor means;

g. counting means for counting the number of pulses of said reference signal which occur between the occurrence of said first and second electrical pulses; and h. display means for displaying the count of the counting means in pressure units.

5. In a pressure measuring apparatus including a Bourdon tube coupled to be responsive to applied pressure at one end thereof to create a deflection angle proportional to said applied pressure at the other end thereof, the combination comprising:

a. a first mirror;

b. motor means coupled to rotate said first mirror along the circumference of a circle at a uniform rate of speed;

c. a second mirror connected to said other end of said Bourdon tube and located at the center of said circle to be rotated in position corresponding to applied pressure;

d. a third mirror fixed in position at the center of said circle;

e. a light source and photoelectric detector so positioned that as said first mirror passes through a start position light from said source is reflected by said third mirror, then by said first mirror, then by said third mirror back to said detector causing a start electrical pulse and as said first mirror passes through a pressured position, light from said source is reflected by said second mirror, then by said first mirror, then by said second mirror back to said detector causing a stop electrical pulse such that the time of occurrence of said stop pulse is indicative of the pressure induced angular rotation of said Bourdon tube;

f. oscillator means coupled to control the speed of said motor means and to provide a reference signal;

g. counting means for counting the number of pulses of said reference signal which occur between the occurrence of said start and stop pulse;

h. means for subtracting from the count of said counter the number of pulses of said reference signal that occur while said first mirror travels from said start position to the zero pressure position; and i. display means for displaying the corrected count of said counting means in pressure units.

6. The pressure measuring apparatus of claim 5 further comprising a second light source and photoelectric detector so positioned that as said first mirror passes through a predetermined synchronization position light from said second source is reflected by said third mirror, then by said first mirror, then by said third mirror back to said second detector causing a synchronization electrical pulse.

7. A method of measuring applied pressure comprising:

a. creating a deflection angle proportional to applied pressure, said deflection angle being the angular rotation induced by said applied pressure in a device which undergoes angular rotation proportional to applied pressure;

b. rotating an object at a uniform rate of speed, a point on said object describing a circle concentric with the axis of rotation of said device; and c. measuring the time required for said point on said object to traverse the arc on the circumference of said circle defined by said deflection angle.

8. The method of claim 7 comprising the additional steps of providing a start pulse when said point on said object rotates through the first point on said arc and a stop pulse when said point on said object rotates through the last point on said arc, and wherein time is measured by electronically counting the number of pulses of a reference oscillator signal which occur between the occurrence of said start and stop pulses.

9. The method according to claim 8 further comprising the step of displaying the count of the electronic counter in pressure units.

10. A method of measuring pressure comprising:

a. applying a pressure to be measured to one end of a Bourdon tube spiral to rotate the other end thereof proportionally to the applied pressure;

b. uniformly rotating an object so that a point on said object describes a circle concentric with the axis of rotation of said other end of said Bourdon tube spiral;

c. producing a stop electrical pulse as said point on said object rotates through a position on said circle corresponding to the angular deflection of said Bourdon tube, the distance of said position along the circumference of said circle being linearly related to said angular deflection of said Bourdon tube;

d. producing a start electrical pulse as said point on said object rotates through a position on said circle corresponding to the undeflected position of said Bourdon tube, such that when said Bourdon tube is in said undeflected position said stop and start electrical pulses will occur simultaneously;

e. counting the pulses of a reference oscilator signal which occur between the respective occurrence of said start and stop electrical pulses; and f. displaying the count of the counter in pressure units.

* * * * *